(No Model.) 2 Sheets—Sheet 1.
W. C. STEVENS.
INSTRUMENT FOR DETERMINING THE INCLINATION OF DITCHES.
No. 508,253. Patented Nov. 7, 1893.
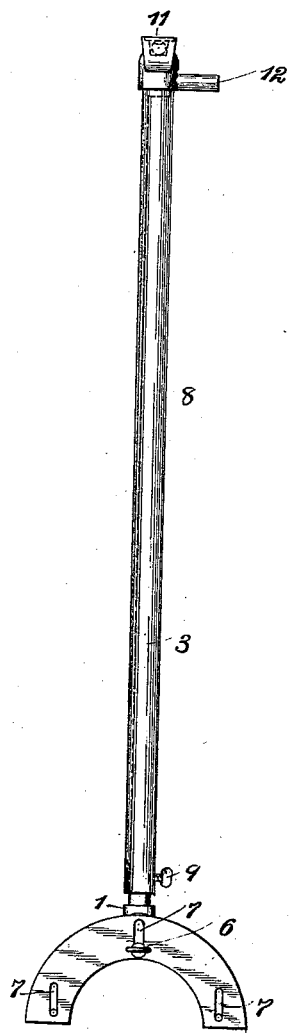
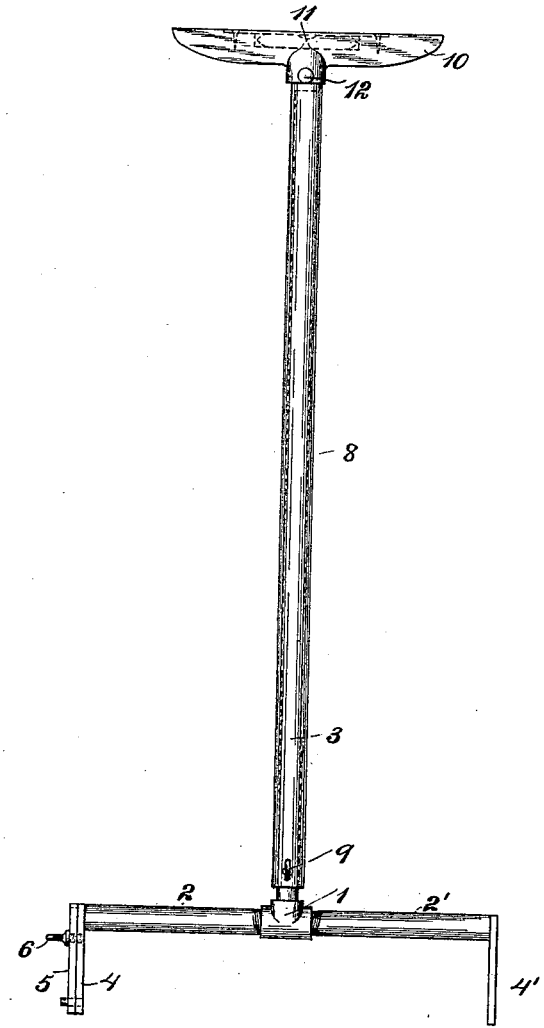
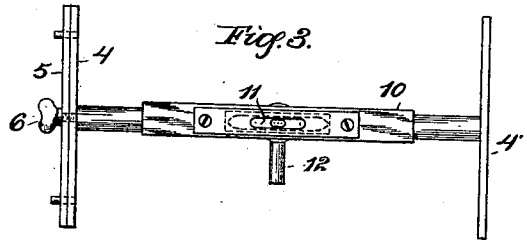

(No Model.) 2 Sheets—Sheet 2.
W. C. STEVENS.
INSTRUMENT FOR DETERMINING THE INCLINATION OF DITCHES.
No. 508,253. Patented Nov. 7, 1893.
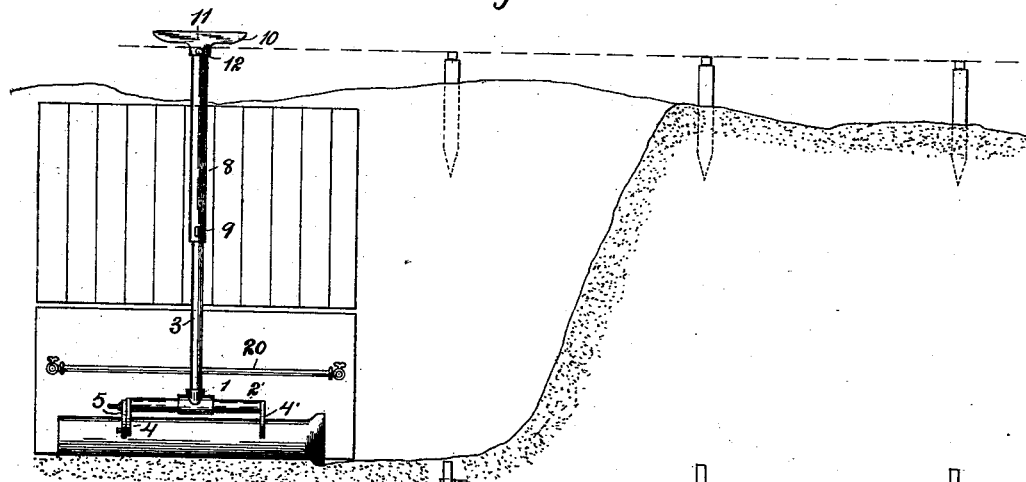
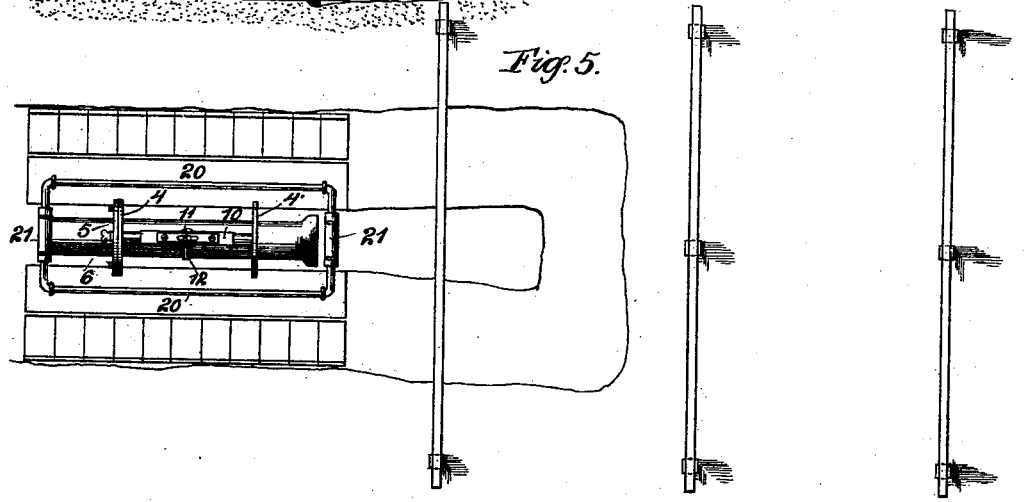
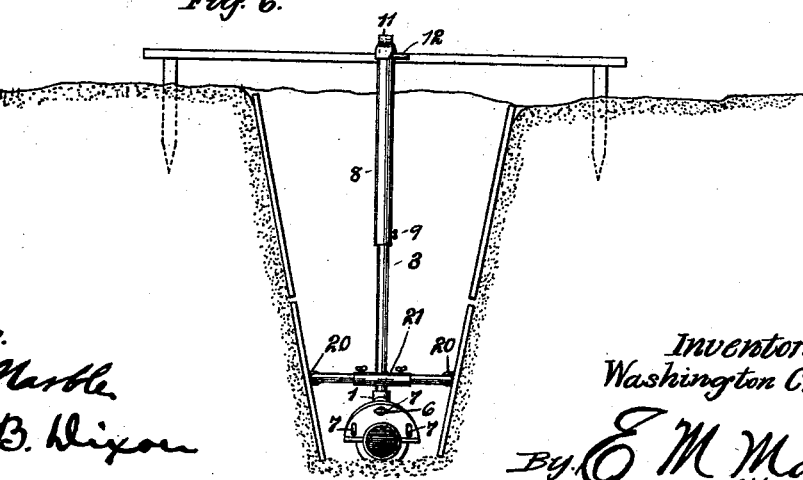
Witnesses.
L. M. Marble
Thos. B. Dixon
Inventor.
Washington C. Stevens.
By E. M. Marble
Attorney.
THE NATIONAL LITHOGRAPHING COMPANY,
WASHINGTON, D. C.

UNITED STATES PATENT OFFICE.

WASHINGTON C. STEVENS, OF MUSKEGON, MICHIGAN.

INSTRUMENT FOR DETERMINING THE INCLINATION OF DITCHES.

SPECIFICATION forming part of Letters Patent No. 508,253, dated November 7, 1893.

Application filed January 24, 1893. Serial No. 459,546. (No model.)

*To all whom it may concern:*

Be it known that I, WASHINGTON C. STEVENS, a citizen of the United States, residing at Muskegon, in the county of Muskegon and State of Michigan, have invented certain new and useful Improvements in Clinometers; and I do hereby declare the following to be a full, clear, and exact description of the invention, such as will enable others skilled in the art to which it appertains to make and use the same.

My invention relates to improvements in clinometers, and it consists in an improved instrument for determining from the surface of the ground the inclination or pitch of ditches in which sewer pipes, gas pipes, and other underground pipes are to be laid, which will be hereinafter fully described, and particularly pointed out in the claims. According to the present mode of laying such underground pipes, it is necessary, after the course which the line of pipes is to follow has been ascertained by a survey of the ground to be passed over, and marked by grade posts, indicating the depth to which the ditch in which the pipes are to be laid is to be dug, to dig the ditch a considerable distance in advance of the sections of pipe laid in order that it may be definitely ascertained that the pitch of the bottom of the ditch is in accordance with that calculated. This method of laying pipes has the disadvantage of interrupting to a greater or less extent the traffic of the streets in which the pipes are laid for several days, there usually being considerable delay in laying down the pipes after the ditch has been made ready for them, and another delay in filling in the ditches after the pipes are laid, thus causing a prolonged inconvenience to those residing on the street, and to the passers by. Large gangs of men must also be employed to dig the long ditches, and afterward to fill them up again.

The object of my invention is to provide means whereby the level of the pipes can be readily and accurately determined at any moment from the surface of the ground, and by the use of which it will be necessary to dig the ditch in advance of the sections of pipe only sufficiently far to permit the laying of pipes to proceed with the desired rapidity. Filling in of the ditch can also take place directly after the sections of pipe are laid. Hence the street will be obstructed for a much shorter space of time than it has to be at present, and a smaller force of men need be employed.

The instrument by which I accomplish the object of my invention is represented in the drawings accompanying and forming a part of my application, in which the same reference numerals refer to the same or corresponding parts, and in which—

Figure 1 is an end view of my improved clinometer; Fig. 2, a side view of the same, and Fig. 3, a top plan view of the same. Fig. 4 is a side view of a ditch in which a section of pipe is represented, showing my improved clinometer as it is used in actual practice. Fig. 5 is a top plan view of the same, and Fig. 6, an end view of the same.

Referring to Figs. 1, 2, and 3, 1 is a T-fitting, into the ends of which are screwed the pipe-lengths 2 and 2', and into the central aperture of which is screwed the rod 3. To the ends of the pipe lengths 2 and 2' are secured the semi-circular yokes 4 and 4', formed to fit around the section of pipe laid, yoke 4 being made vertically adjustable by having secured thereto by the set screw 6 the yoke 5, formed similarly to the yokes 4 and 4', but being provided with the slots 7, which permit of the vertical adjustment above mentioned. I prefer to make the distance between the yokes 4 and 4' just one foot, for a purpose hereinafter to be described, though any other convenient length may be chosen if desired. Around rod 3 is fitted the pipe length 8, to the upper end of which is secured the iron casting 10, made hollow for the reception of the spirit level 11. Pipe 8 is rendered adjustable in position on rod 3 by means of the set screw 9, so that the height of the sighting bar 12, formed on the casting 10 at right angles to the direction of its length, may be varied as desired.

In Figs. 4, 5, and 6, I have represented my clinometer as it appears in actual use, a section of a ditch being represented, the sides of which are planked up to prevent them from falling in, the planking being made in two sections, the lower of which is movable, and is held at the proper distance apart by the bent rods 20, and the adjustable couplings 21. The manner of using my clinometer is as follows: In front of the sections of pipe laid, at intervals of about fifty feet, and at a height indicated by the grade posts, straight edges are laid at right angles to the direction which the pipe is to follow. They are then in the line of sight. The clinometer is then placed on the last section of pipe laid, and the yoke 5 adjusted until the spirit level of the top of the rod 8 shows that a level has been obtained. Pipe 8 is then adjusted on the rod 3 until the sighting bar 12 comes into the line of sight. By this means the depth of the ditch is determined, and, since the distance between yokes 4 and 4' is just one foot, the pitch per foot of the pipe laid. Conversely, it can be thus determined when the ditch has been dug to the proper depth, and when its pitch or inclination is in accordance with that calculated.

By the use of this instrument, as before stated, it is necessary to lay open the ground in advance of the sections of pipe laid only rapidly enough to permit the laying of the pipes to proceed with the desired rapidity, and the filling in of the ditch can take place close behind the sections of pipe laid.

It is evident that changes or modifications may be made in my clinometer without departing from the spirit and scope of my invention, and I do not limit myself to the exact construction shown.

What I claim as new, and desire to secure by Letters Patent, is—

1. The combination with a rod having secured to its ends semi-circular yokes, one of which is vertically adjustable, of a vertically-adjustable rod attached to said rod at right angles to the direction of its length, and means for adjusting the length of the said vertically-adjustable rod, substantially as described.

2. The combination with a rod having secured to its ends semi-circular yokes, one of which is vertically-adjustable, of a vertically-adjustable rod attached to said rod at right angles to the direction of its length, means for adjusting the length of said vertically adjustable rod, and a sighting bar carried on its upper movable portion, substantially as described.

3. The combination with the T-fitting 1, having attached thereto the pipes 2 and 2', to which are secured semi-circular yokes, one of which is vertically adjustable, of the pipe 3 also attached to said T-fitting 1, the pipe 8 fitting over said pipe 3 and provided with means for adjusting its position thereon, and the sighting bar 12 secured to said pipe 8, substantially as described.

In testimony whereof I affix my signature in presence of two witnesses.

WASHINGTON C. STEVENS.

Witnesses:
WILLIAM A. GLEN,
FANNIE H. WHITE.